United States Patent [19]

Grube et al.

[11] Patent Number: 5,483,658
[45] Date of Patent: Jan. 9, 1996

[54] DETECTION OF UNAUTHORIZED USE OF SOFTWARE APPLICATIONS IN PROCESSING DEVICES

[76] Inventors: Gary W. Grube, 157 Cedarwood Ct., Palatine, Ill. 60067; Timothy W. Markison, 555 Northview La., Hoffman Estates, Ill. 60194

[21] Appl. No.: 23,298

[22] Filed: Feb. 26, 1993

[51] Int. Cl.⁶ ................................................. H04L 9/00
[52] U.S. Cl. ................................. 395/800; 380/3; 380/4; 380/23; 380/25; 395/200.11; 395/550; 395/186; 364/DIG. 1; 364/222.5; 364/286.5; 364/286.6
[58] Field of Search ..................................... 395/800, 200, 395/550; 380/3, 4, 25, 23; 364/DIG. 1, 222.5, 286.5, 286.6

[56] References Cited

U.S. PATENT DOCUMENTS

| | | | |
|---|---|---|---|
| 4,866,769 | 9/1989 | Karp | 380/4 |
| 4,956,769 | 9/1990 | Smith | 364/DIG. 1 |
| 5,023,907 | 6/1991 | Johnson et al. | 380/4 |
| 5,032,979 | 7/1991 | Hecht et al. | 364/DIG. 1 |
| 5,113,518 | 5/1992 | Durst, Jr. et al. | 395/550 |
| 5,182,770 | 1/1993 | Medveczky et al. | 380/4 |
| 5,204,897 | 4/1993 | Wyman | 380/4 |
| 5,287,408 | 2/1994 | Samson | 380/4 |

Primary Examiner—Alyssa H. Bowler
Assistant Examiner—Walter D. Davis, Jr.
Attorney, Agent, or Firm—Christopher P. Moreno

[57] ABSTRACT

A monitoring computer monitors the communications occurring within at least one communication system for at least one unique processing device identification code associated with a processing device. Upon detecting the at least one device identification code, the monitoring computer compares the type of application in use by the processing device with known software parameters (including the allowable types of applications and their serial numbers) for the processing device. When the type of application in use by the processing device does not substantially match the known software parameters for the processing device, the processing device is identified as using an unauthorized and/or duplicated software application.

3 Claims, 3 Drawing Sheets

| 201 | 202 | 203 | 204 | 205 | 206 |
|---|---|---|---|---|---|
| DEVICE ID CODE | FEATURES | APPL. TYPE ID'S | APPLICATION SERIAL No.'S | LOCATION AND TIME AND COUNT | GROUP ID CODE |
| 1 | 3,5,7 | 25 | 10-3763 | 2/18:10/3 | 201 |
| 2 | 1,3,8 | 12 | 9-4509756 | 15/18:20/5 | 201 |
| 3 | 3,4,5 | 106 | 49-46383 | 6/14:00/2 | 300 |
| ⋮ | | | | | |

| 207 | 208 | 209 | 210 | 211 |
|---|---|---|---|---|
| GROUP ID CODE | FEATURES | APPL. TYPE ID'S | APPLICATION SERIAL No.'S | COPIES |
| 201 | 1,3,5,7,8 | 25 | 10-3763 | 1 |
|  |  | 12 | 9-4509756 | 1 |
| 202 | 11 | 79 | 30-29463 | 2 |
|  |  |  | 30-29464 |  |
| 300 | 3,4,5,10 | 106 | 49-46383 | 10 |
| ⋮ | | | | |

DETECTION OF UNAUTHORIZED USE OF SOFTWARE APPLICATIONS IN PROCESSING DEVICES

FIELD OF THE INVENTION

The present invention relates generally to communication and computing systems and, in particular, to the detection of unauthorized use of software applications.

BACKGROUND OF THE INVENTION

The basic operation and structure of land mobile radio communication systems and cellular radio/telephone communication systems (communication systems) are known. Ongoing advances in microprocessor, radio frequency (RF), and digital communications technology have led to increased operational capabilities of communication systems. Techniques allowing the transmission of data information (non-voice information) through voice-based communication systems is well known in the art. For example, the use of MDC (Motorola Data Communications standard) in Motorola voice-based communication units allows message signalling to users in a communication system. Furthermore, the existence of digital communication systems, such as Motorola's Astro system, allow even greater capabilities in the transmission of data information. The advancing data capabilities of communication systems essentially demands that communication units have increased computing capacities. Similar to the developments in communication devices discussed above, parallel developments have also occurred in the realm of computing devices.

The basic operation and structure of computing devices, such as personal computers, are known. Technological advances similar to those mentioned above have led to increased communication capabilities of computing devices, particularly through wireless resources. For example, Motorola's Altair system provides wireless Ethernet communications for computer networks. Thus, any Ethernet-compatible computer can perform data transactions through small "repeaters" located within a local area, such as an office or entire building. On a larger scale, the ARDIS system provides data communication service via a nation-wide RF (radio frequency) network system. In this system, data-only terminals, such as the KDT-840, can wirelessly access the network via a plurality of base stations scattered throughout the country. In light of such developments, the differences between communication and computing devices, both hereafter referred to as processing devices, are becoming less distinct. In particular, such processing devices are similar in at least two aspects: they are capable of operating multiple software applications and they have wireless access to communication networks.

Processing devices often utilize various software applications in communicating with one another. For example, processing devices communicating voice information may use a particular voice encoding algorithm embodied in a unique software application. Furthermore, data information communicated between processing devices may use word processing software. Frequently, software applications which enable voice and data communications in processing devices are licensed or purchased by users. For instance, a customer may purchase a Motorola Privacy Plus™ system and pay an extra fee to have software embedded allowing a certain group of communication units to have additional telephone interconnect capabilities. Similarly, users of everyday word processing applications, such as Microsoft Word, must purchase the required software.

Typically, there are two techniques which allow the selective utilization of software applications by a processing device. In the first technique, each processing device is programmed at the manufacturer's factory with software applications stored in a non-volatile memory such as PROM (programmable read-only memory). Processing devices are distinguished by codeplug bits which enable various software applications. Thus, the non-volatile memories of such processing devices contain the same software, but those applications necessary for additional types of communication are enabled (via the codeplug bits) only in authorized processing devices. Alternatively, an external programming device may be used to enable software applications. For instance, many communication products made by Motorola utilize Radio Service Software (RSS), which operates on a typical personal computer, to enable various software features.

A second technique for selective software utilization is to add software applications via an external programming device similar to RSS. For this technique, individual processing devices contain a reprogrammable non-volatile memory such as EEPROM (electrically erasable programmable read-only memory) for storing the software applications. Similarly, software contained in a storage device, such as a floppy disk, can be purchased and added to a personal computer. Unfortunately, neither of the two techniques discussed above are able to fully prevent unauthorized use or possession of software applications.

It is possible for a user to copy the non-volatile memory of a processing device and place the replicated software applications into the non-volatile memory of another processing device, thereby creating a substantially identical processing device without paying an additional fee. Such tactics are often employed in systems where users are charged according to the number of copies of a software application used in the system. Alternatively, anyone in possession of the appropriate external programming device, such as RSS or a floppy disk, can illicitly enable or add unauthorized software applications. The unauthorized use and duplication of software applications not only cheats manufacturers of their entitled fees, they also overburden critically scarce communication resources and interfere with the authorized communications of other processing devices.

Further exacerbating the use of unauthorized software applications is the difficulty of its detection. Often, the only way to detect unauthorized use and duplication is to individually examine each processing device. Obviously, this is a costly proposition when thousands of processing devices are involved. Therefore a need exists for a method which allows the detection of unauthorized use and possession of software applications in processing devices.

DESCRIPTION OF A PREFERRED EMBODIMENT

Generally, the present invention provides detection of unauthorized use and possession of software applications by processing devices linked by at least one radio communication system. This is accomplished by associating a monitoring computer with the communication system to monitor communications within the communication system. While monitoring communications, the monitoring computer compares those applications used by various processing devices, via application serial numbers transmitted by the processing devices, with a database of authorized applications, thus detecting illicit use and/or possession.

Figures 1, 2:
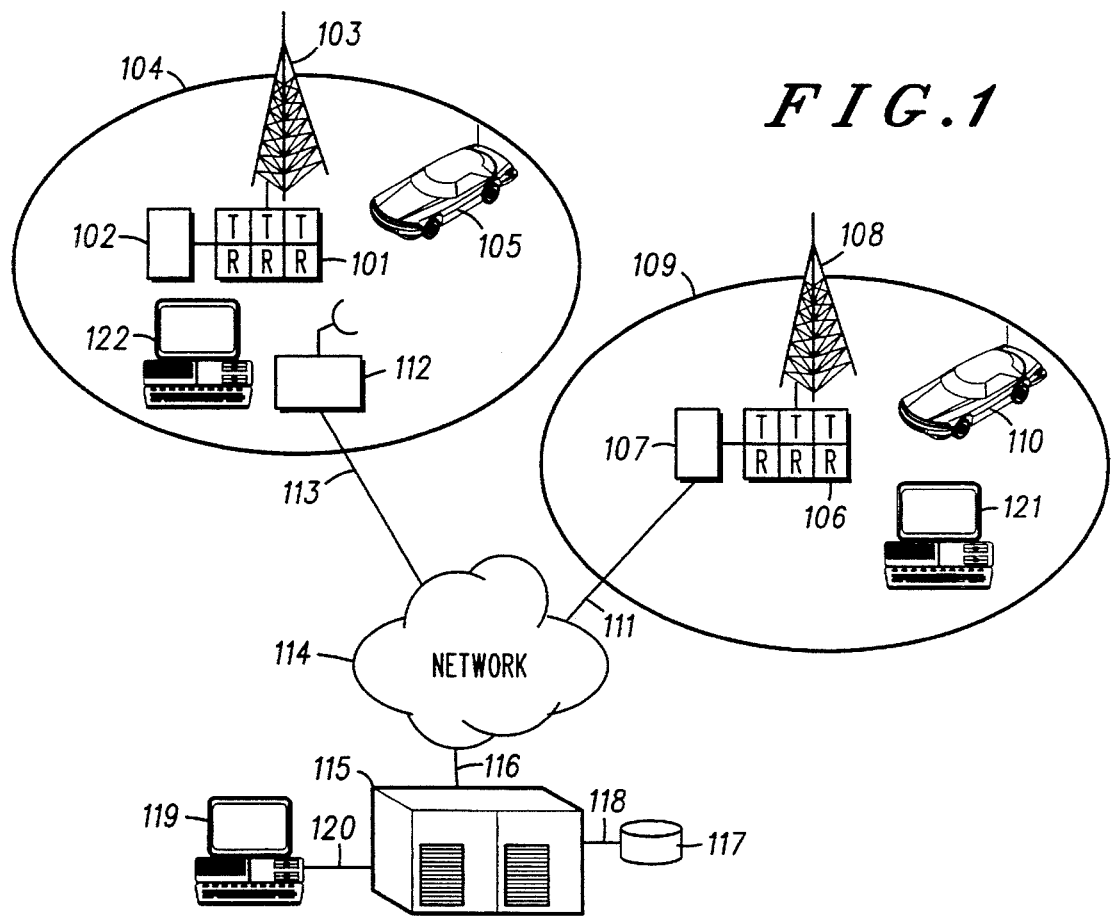
FIG. 1 illustrates a multi-site communication system, equipped with a monitoring computer, in accordance with the present invention.
FIG. 2 illustrates a database format which may be used by the monitoring computer in accordance with the present invention.

The present invention can be more fully described with reference to FIGS. 1–6. FIG. 1 illustrates multiple communication systems operably connected to a monitoring computer. All of the individual elements are readily known in the art, thus no further discussion will be presented regarding their operation other than to further illustrate the present invention. The communication systems comprises a plurality of processing devices (105, 110, 121, 122), a predetermined number of repeaters (101, 106) operably connected to fixed antenna systems (103, 108) providing respective coverage areas (104, 109), and a call processing controller (102, 107) to establish communications between two or more processing devices. A communication system may be interconnected to a network (114) by a direct link (111) to the call processing controller (107). Alternatively, a communication system may be connected by a link (113) to the network (114) by way of an over-the-air radio modem (112), which in turn communicates with the call processing controller (102) over at least one of the channels in the group of site repeaters (101). The network (114) is also connected by a link (116) to a monitoring computer (115) which is operably connected to a database (117) and to at least one computer terminal (119) via links (118,120). The monitoring computer (115), database (117), and computer terminal (119) may comprise a commercially available mid-range computing device, such as an IBM AS400. The link (116) provides the monitoring computer (115) with control information that is embedded in the network (114) protocol. Relevant control information is extracted by the monitoring computer (115) from the network (114) protocol for processing. The manner in which the monitoring computer (115) is coupled to the network (114) as well as the manner in which control information is routed to the monitoring computer (115) is dependant upon the actual computing device used to implement the monitoring computer (115) and the network (114) protocol.

FIG. 2 illustrates database tables which contain, for each processing device to be monitored, software application parameters that are stored in the database (117). In the first table, a device ID code field (201) represents the identities of the processing devices. Processing devices are normally assigned a unique identity code to differentiate them from other processing devices. Associated with each device ID code are several other fields used to determine valid software parameters. The features field (202) lists which of the possible embedded service features this processing device is allowed to use regardless of how the call processing controller (102, 107) actually responds to resource requests. For example, the processing device identified with the device ID code of 3 is allowed to use features 3, 4, and 5. The application type identification field (203) lists, by application type, which additional software applications each device ID code is authorized to use and have possession of. Thus, processing device 3 is allowed to possess and use an application identified by the application type ID as 106, which could correspond to a spreadsheet application, for example. An application serial numbers field (204) lists unique serial numbers associated with each of the application type ID's. Each additional software application shown in the application serial numbers field (204) is uniquely identified by an authorized serial number. Following the current example, processing device 3 is allowed to use the software application type 106, uniquely identified by the serial number 49-46383. A location, time, and count field (205) is used to temporarily store location identities and time-stamps of system access by the processing devices. The count entry within the location, time, and count field (205) is used by the monitoring computer (115) to track the number of accesses to the network (114) by each processing device. Again using the current example, it can be seen that processing device 3 last accessed the system, for the second time, at 1400 hours (2 PM standard time) while located within site 6. Finally, a group ID code field (206) associates an individual device ID code to a group. In the current example, processing device 3 is affiliated with the group identified by the group ID number 300.

Similarly, a second table associates group identities with their authorized features and applications. A group ID code field (207) represents the identity of a group of processing devices. Groups of processing devices are normally associated with a unique group identity code to differentiate them from other groups of processing devices. Associated with each group ID code are several other fields used to determine valid software parameters. The features field (208) lists which of the possible embedded service features units of this group are allowed to use regardless of how the call processing controller (102, 107) actually responds to resource requests. The application type identification field (209) lists, by application type, which additional software applications processing devices associated with a group ID code are authorized to possess and use. An application serial numbers field (210) lists unique serial numbers associated with each of the application type ID's which members of this group ID code are authorized to possess and use. A copies field (211) identifies how many total copies of a particular application type that the members of a group ID code are authorized to possess and use. For example, processing devices affiliated with the group ID code 202 are allowed to use feature 11 only and are further authorized to use no more than 2 copies (as a group) of an additional software application type 79, uniquely identified by the serial numbers 30-29463 and 30-29464.

It is understood that an application code for each processing device can be created, comprised of at least the information embodied in the features, application type ID's, and application serial numbers. This could be done by interleaving the data associated with each of these data fields prior to transmission, and, upon reception, de-interleaving to recover the original data fields. The particular manner in which application codes are derived is dependant upon the channel format and bandwidth of the communication systems being used. The use of an application code allows the monitoring computer to obtain all relevant information needed for the detection of unauthorized possession and use of software applications.

Figure 3:
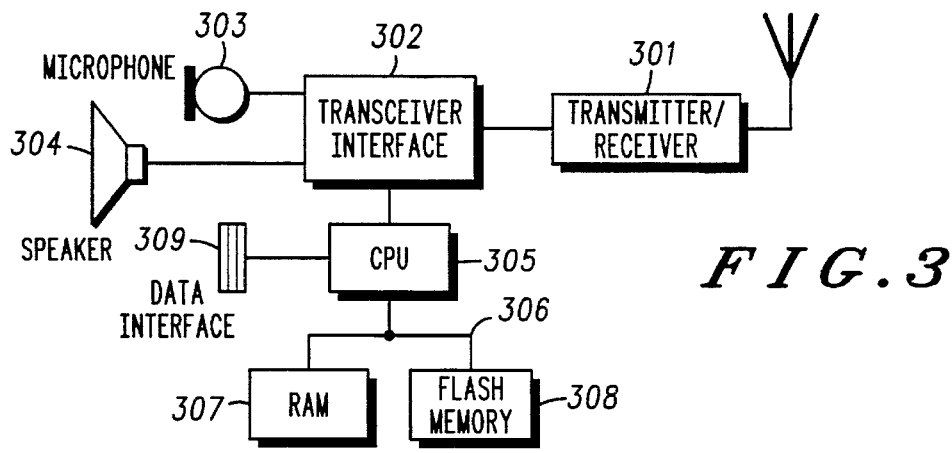
FIG. 3 illustrates a block diagram of a processing device in accordance with the present invention.

FIG. 3 illustrates a block diagram of a processing device used in the present invention. All of the individual elements are readily known in the art, thus no further discussion will be presented regarding their operation other than to further illustrate the present invention. A radio transceiver (301) is employed to link a communication system to the logic and operator of the processing device. Depending on the application or type of communication, different channel activity will take place on the radio link. The communication channels may be TDM (time-division multiplexed) slots, carrier frequencies, a pair of carrier frequencies or other radio frequency (RF) transmission medium. A frequency or time portion of one or more of the communication channels may be established for call control purposes to allow the processing device or processing device logic to communicate with the call processing controller to request and receive system resources. A transceiver interface (302) operably couples the transceiver (301) to the internal logic and audio input/output devices such as a microphone (303) and a speaker (304). These elements may be used in routine voice communications between users of two or more processing devices. In addition to providing modulation/demodulation functions for the microphone (303) and speaker (304), the transceiver interface (302) also couples the processing device CPU (305) and logic to the transceiver (301). The CPU (305) may comprise a Motorola 68HC11 microprocessor. The CPU (305) provides control of the processing device and also provides direct communication to other external computing and processing devices by way of a data interface (309). The data interface (309) may comprise an EIA standard port such as RS-232, RS-422, or another type. The data interface (309) may communicate data communications between users of two or more processing devices and may be used to load new software applications into the processing devices for use at a later time. New software applications are stored in non-volatile flash memory (308) which is operably coupled with the CPU (305) through a data and address bus (306). Temporary operating variables may be stored and retrieved by the CPU (305) in RAM (307).

Figure 4:
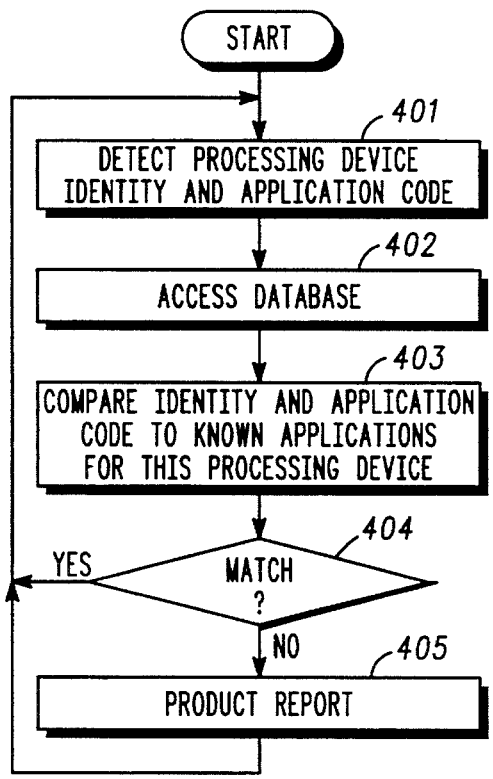
FIG. 4 illustrates a logic diagram that may be used to implement the present invention to detect the unauthorized possession or use of a software application by an individual processing device.

FIG. 4 illustrates a logic diagram that may be implemented by the monitoring computer (115) to detect the unauthorized possession or use of a software application by an individual processing device. Channel activity is monitored at each of the communication systems. This channel activity is a result of communications of at least one processing device served by the communication systems. The communications may contain voice, text, images, multi-media, or other information. The processing device may contain software applications for various types of communications or features such as group dispatch, private call, telephone interconnect, data call, and others. The channel activity routinely contains call establishment and identification information which is communicated to the monitoring computer (115) by a direct link (111) or by a radio link (113). A particular processing device ID code and application code can be detected (401) in this channel activity. The application code may include both an application type identification and serial number of the specific copy of the application. For example, if a word processing application is used to create a message to be communicated, the application type identification could indicate that a word processing application is being used and the serial number could be the application manufacturer's unique serial number associated with that particular copy of the word processing application. The database (117) associated with the monitoring computer (115) is accessed (402) to obtain the information relevant to the previously detected device ID code. If desired, information retrieved from the database (117) can be referenced by the group ID code in place of, or in addition to, the device ID code. The tables of database entries (as in FIG. 2) are examined to compare (403) the application code detected with known software parameters associated with this processing device. The known software parameters include which type of application, as well as the serial number of the application, this processing device is authorized to possess and use. If a match is made (404), i.e. the type and serial number of the application detected in the channel activity matches a known and authorized type and serial number of the application for this processing device, the monitoring computer (115) continues to monitor channel activity.

If, however, a match is not made (404), the monitoring computer (115) identifies this and may generate a report (405) to indicate that the processing device associated with the detected device ID code is using an unauthorized type and/or a duplicated software application. If the type of application used is compared with the allowable application type for a group and a match is not made, the monitoring computer (115) identifies this and may generate a report (405) to indicate that at least one processing device associated with the detected group ID code is using an unauthorized type and/or a duplicated software application. Upon completion of the report, or while the report is being compiled, further channel activity monitoring continues as described above.

Figure 5:
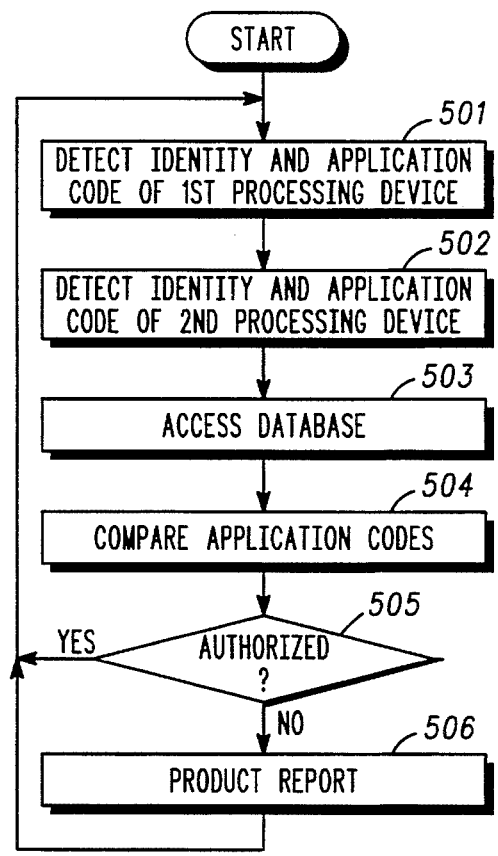
FIG. 5 illustrates a logic diagram that may be used to implement the present invention to detect the unauthorized possession or use of the same software application by two or more processing devices when different ID codes are used.

FIG. 5 illustrates a logic diagram that may be implemented by the monitoring computer (115) to detect the unauthorized possession or use of the same software application by two or more processing devices when different device ID codes are used. Channel activity is monitored at each of the communication systems. This channel activity is a result of communications of at least one processing device served by the communication systems. The communications may contain voice, text, images, multi-media, or other information. The processing device may contain software applications for various types of communications or features such as group dispatch, private call, telephone interconnect, data call, and others. The channel activity routinely contains call establishment and identification information which is communicated to the monitoring computer (115) by a direct link (111) or by a radio link (113). A unique first processing device ID code and software application code can be detected (501) in this channel activity. The software application code may include both an application type identification and serial number of the specific copy of the application. A unique second processing device ID code and software application code can also be detected (502) in this channel activity. The database (117) associated with the monitoring computer (115) is accessed (503) to obtain the information relevant to the previously detected processing device ID codes. If desired, information retrieved from the database (117) can be referenced by the group ID code in place of, or in addition to, the device ID code. The tables of database entries (as in FIG. 2) are examined to determine the software application codes that are authorized for these individual processing devices. For example, while both of the processing devices may be authorized to use the same type of application, they may not be authorized to use the same application copy as identified by the serial number.

The software application codes previously detected in use by the processing devices associated with the first and second ID codes are compared (504). If the software application codes do not match, i.e. the processing devices associated with the first and second ID codes having different software application codes, the use of applications with the same serial number has not been detected. Hence, the use of the application is authorized (505) and the monitoring computer (115) continues monitoring channel activity to detect subsequent device ID codes.

If a match is made, i.e. the processing devices associated with the first and second ID codes have the same software application code, the authorization determination (505) will check the database information previously accessed to determine if two or more copies of the same application serial number are allowed. If they are authorized, the monitoring computer (115) continues monitoring channel activity to detect subsequent ID codes. If, however, the authorization check (505) determines that the two processing devices are not allowed to share the same copy, as referenced by the serial number, of application software, the monitoring computer (115) identifies this and may generate a report (506) to indicate that the processing devices associated with the detected device ID codes are using an unauthorized type and/or a duplicated software application. Upon completion of the report, or while the report is being compiled, further channel activity monitoring continues as described above.

Figure 6:
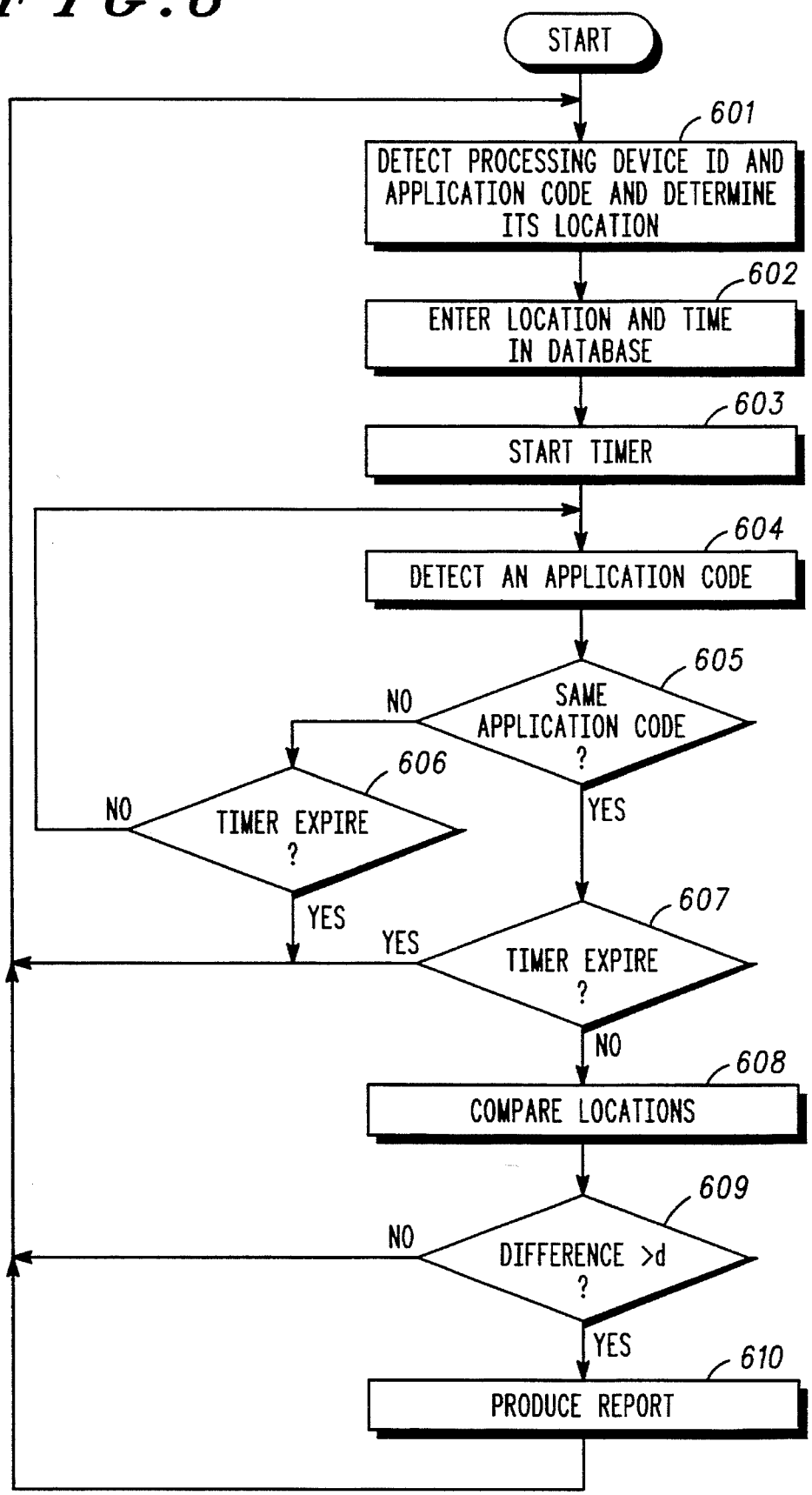
FIG. 6 illustrates a logic diagram that may be used to implement the present invention to detect the unauthorized possession or use of the same software application by two or more processing devices when the same ID code is used.

FIG. 6 illustrates a logic diagram that may be implemented by the monitoring computer (115) to detect the unauthorized possession or use of the same software application by two or more processing devices when the same device ID code is used. Channel activity is monitored at each of the communication systems. This channel activity is a result of communications of at least one processing device served by the communication systems. The communications may contain voice, text, images, multi-media, or other information. The processing device may contain software applications for various types of communications or features such as group dispatch, private call, telephone interconnect, data call, and others. The channel activity routinely contains call establishment and identification information which is communicated to the monitoring computer (115) by a direct link (111) or by a radio link (113). A particular processing device ID code can be detected (601) in this channel activity. The software application code and location of the processing device is also determined (601) from the channel activity. The application code may include both an application type identification and serial number of the specific copy of the application. The database (117) associated with the monitoring computer (115) is accessed to enter (602) the application code, location and time of the communication detected for the associated processing device ID code. At the same time, the monitoring computer (115) starts a software timer (603) to measure the passage of time since the initial detection of the given software application code in use. Similar to step (601), the monitoring computer (115) continues monitoring transmissions to detect processing device activity and to detect (604) a software application code in use by and/or possession of a processing device. The tables of database entries (as in FIG. 2) are examined to compare the software application code for the device ID code just detected with the software application code associated with the previously detected device ID code to determine if they are the same (605). If a match is not made (605), i.e. the software application code for the device ID code just detected does not match the software application code associated with the previously detected device ID code, the monitoring computer (115) determines (606) if the software timer has expired. If the timer has not expired, the monitoring computer (115) continues to monitor communication traffic to detect yet another software application code. If the timer (606) has expired, i.e. a predetermined period of time has elapsed since the timer was started, the process of detecting use of a software application code by a processing device is restarted.

In the event that the software application code just detected is the same (605) as the software application code associated with the previously detected device ID code and stored in the database, the monitoring computer (115) continues to determine (607) if the software timer has expired. If the timer (607) has expired, which may be anywhere from a few minutes to several hours, the process of detecting use of the same software application code by a processing device is restarted. If the timer has not expired (607), the location of the processing device generating the detected channel activity is determined and compared (608) to the location, stored in the database, of the previous communication associated with this same software application code. A difference between the two locations is determined and compared (609) to a predetermined threshold distance of length d. The determination of d is based on the physical impracticality of a single processing device being able to travel that distance before the expiration of the timer. If the difference between locations is less than or equal to this predetermined distance, the process of detecting use of a software application code is restarted. If the difference between locations is greater than the predetermined distance, the monitoring computer (115) identifies this and may generate a report (610) to indicate that the software application code just detected is being used in an unauthorized fashion by two or more processing devices. Upon completion of the report, or while the report is being compiled, further channel activity monitoring continues as described above.

It is understood that the procedures described above to detect the unauthorized use and duplication of software applications in processing devices can be modified to be performed monitoring on an active, rather than passive, basis. That is, rather than the monitoring computer only monitoring communications as they occur, it can also transmit requests for information to the processing devices. When the requested information is provided to the monitoring computer, the process of detecting unauthorized and/or duplicated of software applications can continue as described above. Furthermore, it is understood that other methods may be used to detect unauthorized use and duplication of software applications. For instance, the number of times in which an application code, comprised of at least an application serial number, is used within the network within a predetermined period of time can be stored and compared with a predetermined value. In the event that the predetermined value is exceeded, the monitoring computer can identify this. A report can be generated to indicate that the application associated with the detected software application code may have been illegally copied, as shown by the higher frequency of its use.

The present invention allows a monitoring computer to monitor channel activity of multiple communication systems to compare the types of applications used by the plurality of processing devices to a predetermined database of authorized types of applications. A report can be issued in the event that the types of applications used by at least one processing device do not match the predetermined list of authorized types of applications. This process is also applicable to processing devices that are referenced according to their group ID codes. By monitoring communications in this manner, the unauthorized use and duplication of software applications in processing devices can be detected without physically investigating each processing device.

We claim:

1. A method for detecting unauthorized duplication of software applications in at least one processing device that includes a radio link, the method comprises the steps of:

a) when a first processing device is communicating with a communication system via the radio link, detecting, by a monitoring computer, a unique identity of the first processing device and a software application code;

b) when a second processing device is communicating with the communication system via the radio link, detecting, by the monitoring computer, a unique identity of the second processing device and a software application code;

c) when the unique identity and the software application code of the first processing device and the second processing device are detected, comparing, by the monitoring computer, the software application code of the first processing device with the software application code of the second processing device; and d) when the software application code of the first processing device matches the software application code of the second processing device, identifying, by the monitoring computer, that the first processing device and the second processing device have unauthorized duplication of at least one software application.

2. The method of claim 1 further comprises generating, by the monitoring computer, a report indicating the unauthorized duplication of at least one software application in at least one processing device.

3. A method for detecting unauthorized possession of at least one software application in at least two processing devices which include a radio link, the method comprises the steps of:

a) when a processing device is communicating with a communication system via the radio link, detecting, by a monitoring computer, a unique software application code to produce a first detected unique software application code;

b) when the first detected unique software application code is detected, determining, by the monitoring computer, location of a processing device utilizing the first detected unique software application code;

c) when the first detected unique software application code is detected, entering, by the monitoring computer, the location of the processing device utilizing the first detected unique software application code in a database and initiating a software timer;

d) detecting, subsequent to the detection of step (a) by the monitoring computer, the unique software application code again to produce a second detected unique software application code;

e) when the second detected unique software application code is detected, determining, by the monitoring computer, location of a processing device utilizing the second detected unique software application code;

f) when the second detected unique software application code is detected, entering, by the monitoring computer, the location of the processing device utilizing the second detected unique software application code in the database;

g) determining, by the monitoring computer, whether the software timer has expired when the second unique software application code is detected;

h) when the software timer has not expired, comparing, by the monitoring computer, the location of the processing device utilizing the first detected unique software application code with the location of the processing device utilizing the second detected unique software application code; and i) when the location of the processing device utilizing the first detected unique software application code is greater than a predetermined distance from the location of the processing device utilizing the second detected unique software application code, identifying, by the monitoring computer, the unauthorized possession of at least one software application in at least two processing devices.

* * * * *